United States Patent
Harmer et al.

(10) Patent No.: US 6,867,943 B2
(45) Date of Patent: Mar. 15, 2005

(54) EFFICIENT FEEDFORWARD COMPENSATION FOR REPEATABLE RUNOUT IN A DISC DRIVE

(75) Inventors: Brent Jay Harmer, Johnstown, CO (US); Jianbo J. He, Longmont, CO (US); Khalil B. Dizaji, Louisville, CO (US); Hai Thanh Ho, Broomfield, CO (US); Reed David Hanson, Chaska, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 310 days.

(21) Appl. No.: 10/180,569

(22) Filed: Jun. 26, 2002

(65) Prior Publication Data
US 2003/0112544 A1 Jun. 19, 2003

Related U.S. Application Data
(60) Provisional application No. 60/357,241, filed on Feb. 14, 2002, provisional application No. 60/342,040, filed on Dec. 18, 2001, and provisional application No. 60/342,072, filed on Dec. 18, 2001.

(51) Int. Cl.$^7$ .............................................. G11B 5/596
(52) U.S. Cl. .................................................. 360/77.04
(58) Field of Search ............................... 360/77.04, 75, 360/77.02, 77.08

(56) References Cited

U.S. PATENT DOCUMENTS

| | | | | |
|---|---|---|---|---|
| 5,109,306 A | * | 4/1992 | Mase et al. ............... 360/77.04 |
| 5,550,685 A | * | 8/1996 | Drouin ..................... 360/77.04 |
| 5,585,976 A | | 12/1996 | Pham ....................... 360/77.04 |
| 5,646,797 A | * | 7/1997 | Kadlec et al. ................. 360/75 |
| 5,760,990 A | * | 6/1998 | Ukani et al. .............. 360/77.04 |
| 5,886,846 A | | 3/1999 | Pham et al. .............. 360/77.04 |
| 5,920,441 A | | 7/1999 | Cunningham et al. | |
| 5,923,491 A | | 7/1999 | Kisaka et al. ........ 360/77.04 X |
| 5,995,316 A | | 11/1999 | Stich | |
| 5,999,357 A | | 12/1999 | Serrano | |
| 6,005,742 A | | 12/1999 | Cunningham et al. | |
| 6,097,565 A | * | 8/2000 | Sri-Jayantha et al. .... 360/77.04 |
| 6,141,175 A | | 10/2000 | Nazarian et al. | |
| 6,236,895 B1 | | 5/2001 | Romano et al. | |
| 6,310,742 B1 | | 10/2001 | Nazarian et al. | |
| 6,449,116 B2 | | 9/2002 | Morris et al. ............ 360/77.04 |
| 6,611,396 B1 | * | 8/2003 | Kermiche et al. ....... 360/77.04 |
| 6,707,635 B1 | * | 3/2004 | Codilian et al. ......... 360/77.04 |

* cited by examiner

Primary Examiner—Sinh Tran
Assistant Examiner—James L Habermehl
(74) Attorney, Agent, or Firm—David K. Lucente; Derek J. Berger (57) ABSTRACT

Method and apparatus for more accurate track following. Control circuitry rotates a data storage surface containing thousands of annular tracks. A "measured" subset of the tracks is selected so as to be interspersed with an "unmeasured" subset. The calibration profile is derived based on position error signals each obtained by reading from the measured subset and not from the unmeasured subset. Data from the unmeasured subset of tracks is ignored, in generating and/or updating the profile.

30 Claims, 7 Drawing Sheets

EFFICIENT FEEDFORWARD COMPENSATION FOR REPEATABLE RUNOUT IN A DISC DRIVE

CROSS-REFERENCE TO RELATED APPLICATIONS

This application claims the benefit of U.S. provisional application Ser. No. 60/357,241 filed Feb. 14, 2002; Ser. No. 60/342,040 filed Dec. 18, 2001; and Ser. No. 60/342,072 filed Dec. 18, 2001.

FIELD OF THE INVENTION

This application relates generally to data storage devices and more particularly to recording position data onto discs thereof.

BACKGROUND OF THE INVENTION

Disc drives are data storage devices that store digital data on a rotating disc. Modern disc drives comprise one or more rigid information storage discs that are coated with a magnetizable medium and mounted on the hub of a spindle motor for rotation at a constant high speed. Information is stored on the discs in a plurality of concentric circular tracks typically by an array of transducers mounted to a radial actuator for movement of the heads relative to the discs. During a data write operation sequential data is written onto the disc track, and during a read operation the head senses the data previously written onto the disc track and transfers the information to an external environment. Important to both of these operations is the accurate and efficient positioning of the head relative to the center of the desired track on the disc. Head positioning within a desired track is dependent on head-positioning servo patterns, i.e., a pattern of data bits recorded on the disc surface and used to maintain optimum track spacing and sector timing. Servo patterns or information can be located between the data sectors on each track of a disc ("embedded servo"), or on only one surface of one of the discs within the disc drive ("dedicated servo"). Regardless of whether a manufacturer uses "embedded" or "dedicated" servos, the servo patterns are typically recorded on a target disc during the manufacturing process of the disc drive.

Recent efforts within the disc drive industry have focused on developing cost-effective disc drives capable of storing more data onto existing or smaller-sized discs. One potential way of increasing data storage on a disc surface is to increase the recording density of the magnetizable medium by increasing the track density (i.e., the number of tracks per inch). Increased track density requires more closely-spaced, narrow tracks and therefore enhanced accuracy in the recording of servo-patterns onto the target disc surface. This increased accuracy requires that servo-track recording be accomplished within the increased tolerances, while remaining cost effective.

Servo patterns are typically recorded on the magnetizable medium of a target disc by a servo-track writer ("STW") assembly during the manufacture of the disc drive. One conventional STW assembly records servo pattern on the discs following assembly of the disc drive. In this embodiment, the STW assembly attaches directly to a disc drive having a disc pack where the mounted discs on the disc pack have not been pre-recorded with servo pattern. The STW does not use any heads of its own to write servo information onto the data surfaces, but uses the drive's own read/write heads to record the requisite servo pattern to mounted discs.

In light of the explosive trend toward higher track densities in recent years, some exceeding 100,000 tracks per inch, this conventional method has become excessively time consuming. As the trend continues, it will apparently be necessary for every disc drive manufacturer to obtain and operate much larger numbers of STW's to maintain comparable numbers of disc drives. One strategy to mitigate this need is to utilize multi-disc "ex situ" STW's, which are are capable of recording servo patterns to multiple discs mounted in a stack. After writing some of the position information using (dedicated) servo recording heads, sequentially or simultaneously, the discs are then removed and loaded into disc drives for use.

With any of these methods, substantial errors in the shapes and/or positions of tracks remain. Seagate Technology has devised several compensation systems that seek to correct such errors so that a head can follow a more circular path while reading and writing data. These systems rely on large numbers of embedded correction values called "Zero Acceleration Path" (ZAP) correction factors. Fully implemented, ZAP correction factors are very effective for adjusting track shapes. Unfortunately, such an implementation may cost too much, in light of current trends toward higher track density.

What is needed is an efficient system for making use of coherent runout, meaning written-in error that is very similar in phase and magnitude from track to track, at least over a localized region of a disc surface. Because coherent runout often accounts for a large portion of written-in errors in servo marks, such a system should improve disc drive performance, reduce manufacturing costs, or both.

SUMMARY OF THE INVENTION

The present invention improves the efficiency of transducer positioning by making use of a novel type of calibration profile. In one embodiment, a method, a data storage surface containing thousands of annular tracks is rotated. A "measured" subset of the tracks is selected so as to be interspersed with an "unmeasured" subset. The calibration profile is derived based on position error signals each obtained by reading from the measured subset and not from the "unmeasured" subset. Significant resource savings are achieved by ignoring data from the "unmeasured" subset of tracks.

Another embodiment, an apparatus, includes a data storage surface with a first subset and a second subset of tracks interspersed together. The apparatus also includes means for using a calibration table stored on the disc stack. The calibration table is derived from several position error signals each obtained by reading from the first subset and not by reading from the second subset. Additional features and benefits will become apparent upon reviewing the following figures and their accompanying detailed description.

DETAILED DESCRIPTION

Although the examples below show more than enough detail to allow those skilled in the art to practice the present invention, subject matter regarded as the invention is broader than any single example below. The scope of the present invention is distinctly defined, however, in the claims at the end of this document.

Numerous aspects of data storage device technology that are not a part of the present invention (or are well known in the art) are omitted for brevity, avoiding needless distractions from the essence of the present invention. For example, this document does not include specifics of how PES is used to control the position of a transducer head. Neither does it include specific methods for representinging shape information in a calibration profile. Specific materials for writing servo marks (with or without embedded adjustment fields) are likewise omitted, typically being a simple matter of design choice.

Definitions and clarifications of certain terms are provided in conjunction with the descriptions below, all consistent with common usage in the art but some described with greater specificity. For example, an "anti-follow" system is one that artificially adjusts a radial position of at least one user-accessible data sector on a data surface by at least 10% of a nominal data track width. (This is "anti-follow" in the sense that the track is moved rather than followed as originally written.) Seagate uses such a system, incorporating "correction factors" to compensate for imperfect placement of servo fields, to make user data tracks more circular. This "Zero Acceleration Path" (ZAP) system is so named because it enables a transducer to remain over a selected, artificially adjusted track with little or no radial acceleration.

Two values are "very similar" if they are within 10 (if in phase) or within 1% (if in magnitude). A calibration profile is "used" by injecting values therefrom into a control loop. Using a calibration profile "substantially eliminates" an RRO if the magnitude of most actual position errors caused by the RRO are reduced by at least 50%.

Figure 1:
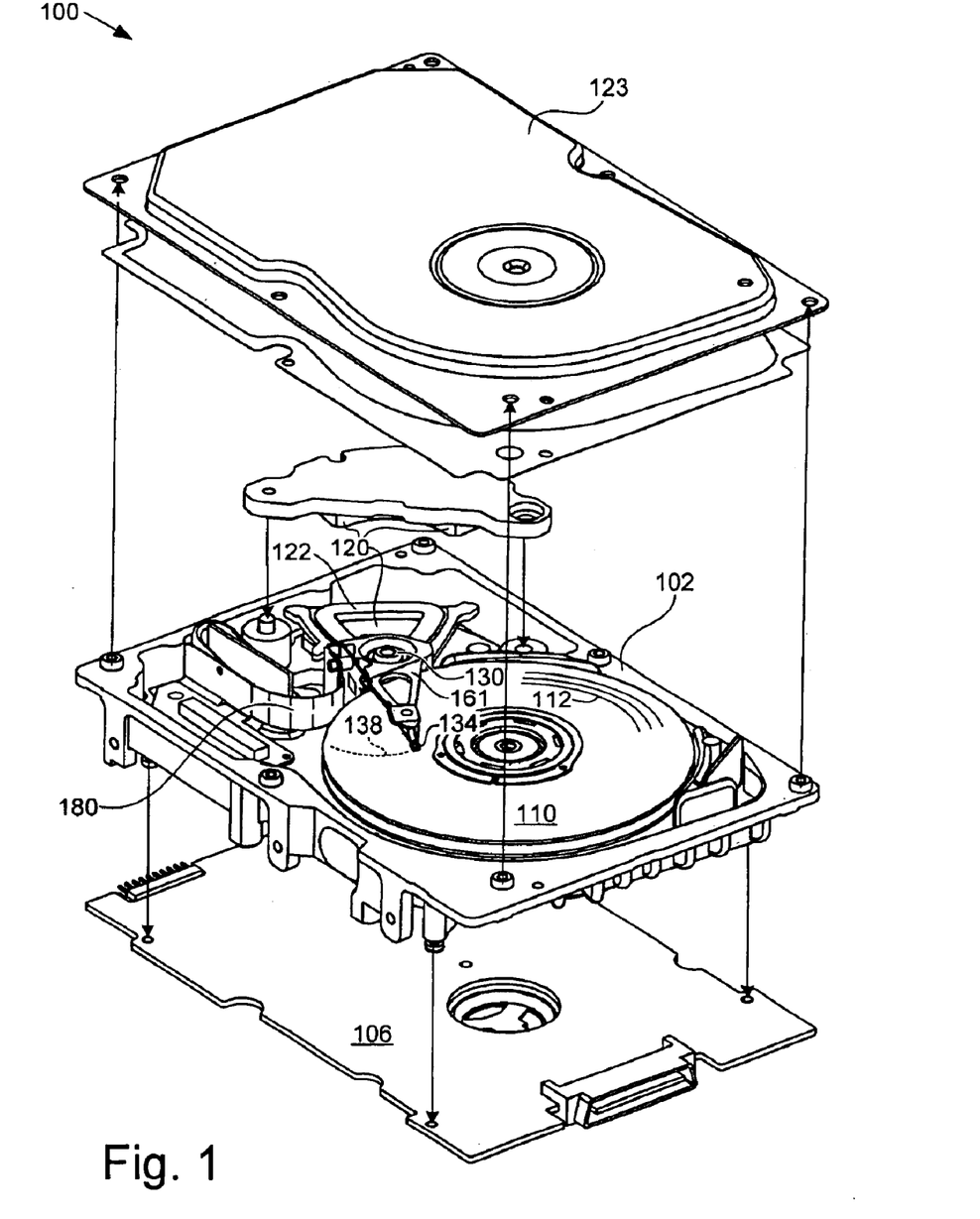
FIG. 1 shows a data storage device constructed in accordance with a preferred embodiment of the present invention.

Turning now to FIG. 1, there is shown a data storage device 100 constructed in accordance with a preferred embodiment of the present invention. Device 100 is a disc drive including base 102 to which various components are mounted. Top cover 123 cooperates with base 102 conventionally to form a sealed chamber. The components include a spindle motor which rotates data storage discs 110 at several thousand revolutions per minute. Information is written to and read from tracks 112 on discs 110 through the use of an actuator assembly 161, which rotates during a seek operation about a bearing shaft assembly 130 positioned adjacent discs 110. Actuator assembly 161 includes a plurality of actuator arms which extend above and below each disc 110, with one or more flexures extending from each of the actuator arms. Mounted at the distal end of each of the flexures is a transducer head 134 which includes an air-bearing slider enabling transducer head 134 to fly in close proximity above the corresponding surface of associated disc 110.

Servo and user data travels through transducer head 134 and flex cable 180 to control circuitry on controller board 106. (Controller board 106 is optionally configured to perform the methods described below with reference to FIGS. 4–6). Flex cable 180 maintains an electrical connection by flexing as transducer heads 134 traverse tracks 112 along their respective radial paths 138. By "radial," it is meant that path 138 is substantially aligned with a radius of the disc(s) 110, although their directions may be offset from a perfectly radial direction by up to about 20 degrees due to head skew, as is understood in the art.

During a seek operation, the overall track position of transducer heads 134 is controlled through the use of a voice coil motor (VCM), which typically includes a coil 122 fixedly attached to actuator assembly 161, as well as one or more permanent magnets 120 which establish a magnetic field in which coil 122 is immersed. The controlled application of current to coil 122 causes magnetic interaction between permanent magnets 120 and coil 122 so that coil 122 moves. As coil 122 moves, actuator assembly 161 pivots about bearing shaft assembly 130 and transducer heads 134 are caused to move across the surfaces of discs 161 between the inner diameter and outer diameter of the disc(s) 161. Fine control of the position of head 134 is optionally made with a microactuator (not shown) that operates between the head 134 and the actuator arm.

Figure 2:
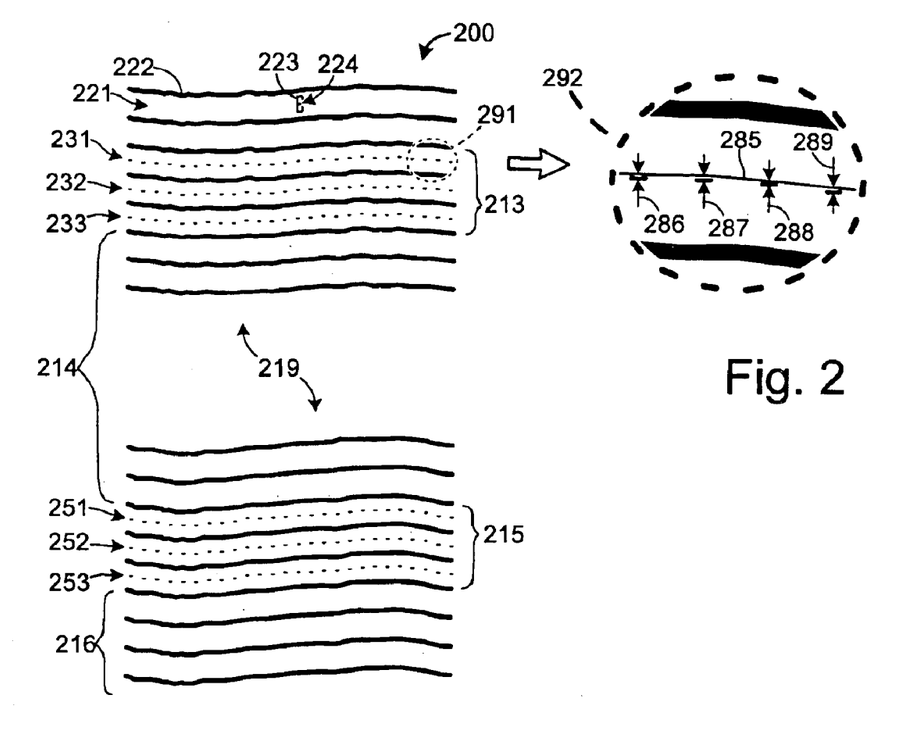
FIG. 2 shows a physical layout of many data tracks on one data storage surface of a rotating disc like those of FIG. 1.

FIG. 2 shows many data tracks 221 (separated by track delineation lines 222, at least conceptually) on one data storage surface 200 of a rotating disc like those of FIG. 1. Tracks 221 are each wide enough for transducer head 223 to follow within it. Reference position indicator marks 231, 232,233,251,252,253 define an ideal center of the tracks. Ideally, the effective center 224 of the head 223 travels along each track 221 directly over each of these reference marks. Although it is conventional to think of tracks 221 as circular and concentric about the stack's axis of rotation, the present invention relates to flaws in the shapes of such tracks. Such flaws manifest themselves crookedness in the rows of servo marks 231,232,233, greatly exaggerated in FIG. 2.

To stay within the imperfect tracks 221, head 223 generates a position error signal (PES) indicating a radial direction and magnitude of any errors in the head's position, relative to the servo marks 231,232,233. The use of these marks is shown in greater detail in the region 291, a more magnified version of which is shown in region 292. The effective center 224 of head 223 travels along a path 285 while head 223 generates several values 286,287,288,289 indicative of the difference between the path 285 position and the positions of the servo marks 231,232,233. These values constitute the PES signal.

For reasons that will later become apparent, all of the usable tracks of data surface 200 are allocated into two interspersed subsets. One subset contains all of the tracks from which data is taken for use in deriving a calibration profile. This subset contains tracks 213 and tracks 215. The other subset, which contains tracks 214 and tracks 216, contains all of the tracks from which data is not used in deriving the calibration profile. It is expected that the second subset will contain a much larger number of tracks than the first subset, as indicated by the radial gap 219 hundreds of tracks wide, or wider. (Note that servo marks of tracks in the second subset exist but are not shown, for ease of understanding.)

It is important to note that the general shape of all of the pictured tracks above gap 219 is somewhat similar. Also, the general shape of all of the tracks below gap 219 is somewhat similar, but is somewhat different from that of the pictured tracks above gap 219. The "above" and "below" tracks are each an example of a "localized region" of the data surface 200. Within each of these localized regions, this similarity in non-circular shape indicates a significant level of coherent RRO. Applicant has ascertained that this condition is often met in data surfaces of modern disc drives. This is especially true in the build process, which will generally suffer from disc centering offsets, disc clamping distortions, spindle runout, and similar sources of coherent RRO.

Figure 3:
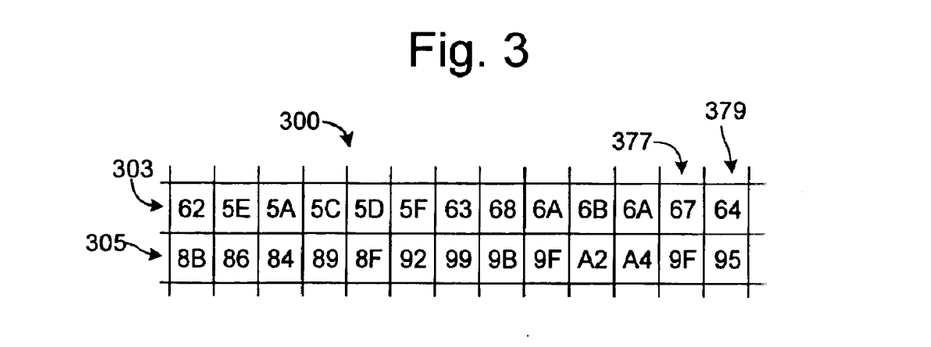
FIG. 3 shows a rectangular table that exemplifies a calibration profile of the present invention.

FIG. 3 shows a table 300 that exemplifies a calibration profile of the present invention. Table 300 contains a higher row 303 summarizing the shape of the "above" localized region of FIG. 2. It also contains a lower row 305 summarizing the shape of the "below" localized region of FIG. 2.

Each cell of row 303 contains a hexadecimal value indicating a radial shape indicator. Starting from the left, the values decrease from 98 (62 h), down to 90 (5Ah), up to 107 (6Bh), and down to 100 (64 h). This corresponds to the fluctuation (down, up and down) shown in the "above" tracks of FIG. 2. The last two cells 377,379 of row 303 correspond to the servo marks shown in magnified region 292.

It will be appreciated by those skilled in the art that a calibration profile like that of FIG. 3 requires significantly less storage space than would be required for ZAP or other conventional schemes. This advantage allows for important changes in the archicture and/or in the manufacture of disc drives.

Figure 4:
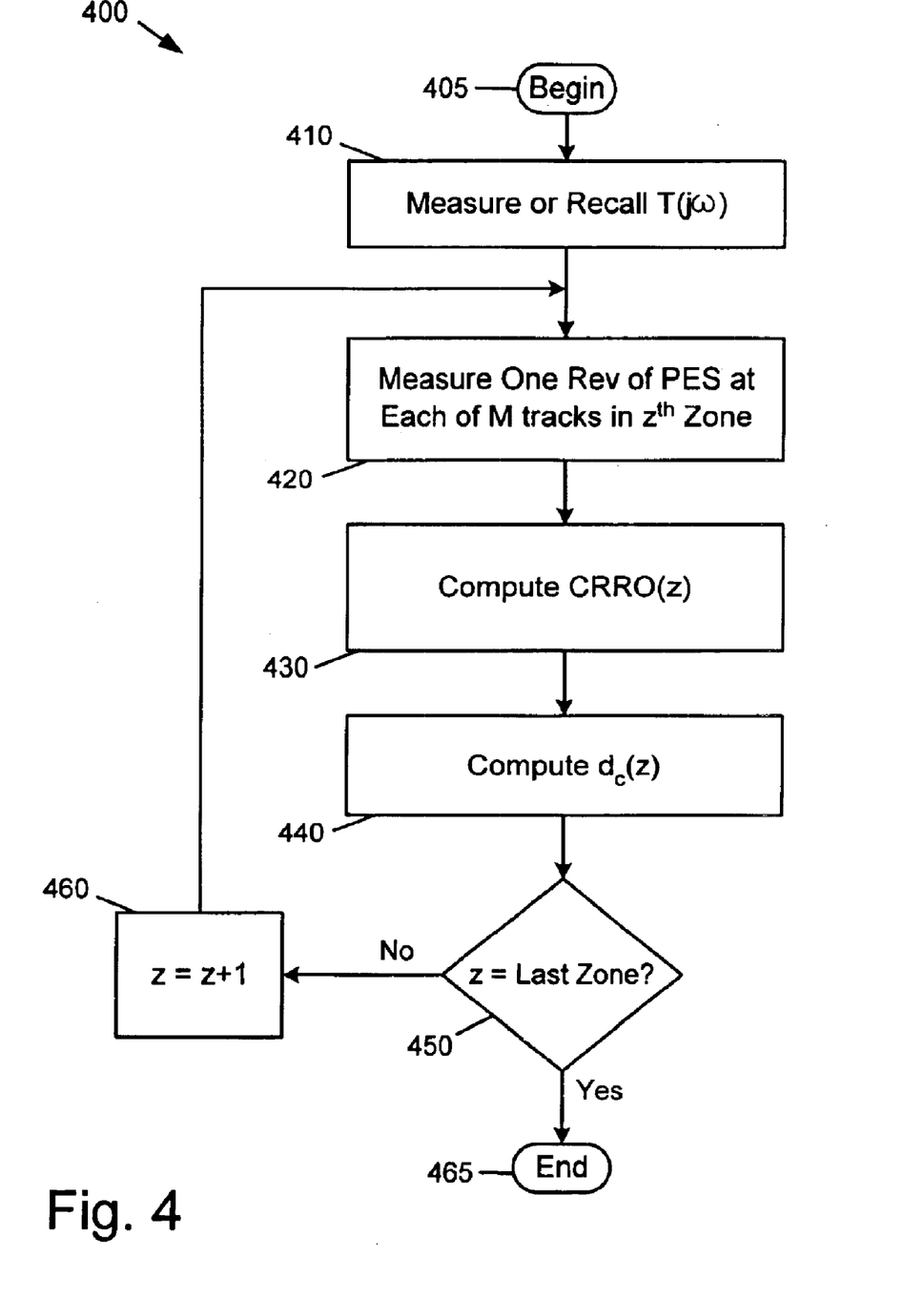
FIG. 4 shows a basic method of deriving compensation values of the present invention.

FIG. 4 shows a basic method 400 of deriving compensation values of the present invention comprising steps 405 through 465. In step 410, the closed loop transfer function T(jω) is derived as K(jω)P(jω)÷[1+K(jω)P(jω)], where K represents the controller and P represents the actuator dynamics. This transfer function can either be custom measured on each drive or a "typical" drive response may be stored in ROM and used for all drives.

In step 420, the PES(k) is measured at M equally spaced tracks in zone z. Here PES(k) represents one revolution of PES data on track k, which can be expressed as $$PES(k) = \begin{bmatrix} pes(0) \\ pes(1) \\ \vdots \\ pes(N-1) \end{bmatrix}$$

where pes(i) is the position error reading on sector i and N is the number of servo sectors per revolution.

In step 430, the coherent RRO for zone z is computed as $$CRRO(z) = \frac{1}{M} \sum_{i=0}^{M-1} PES(Z_{start}(z) + i * Z_{inc})$$

where $Z_{start}(z)$ is the first track in zone z, and $Z_{inc}$ is the spacing between the tracks averaged in the zone.

In step 440, the correction values for zone z are calculated as $$d_c(z) = DFT^{-1}[DFT(CRRO(z))/T(j\omega)]$$

where DFT is the Discrete Fourier Transform and $DFT^{-1}$ is the inverse Discrete Fourier Transform.

If the just-processed zone z is not the last zone 450, steps 420 through 440 are then performed on the next zone 460.

Figure 5:
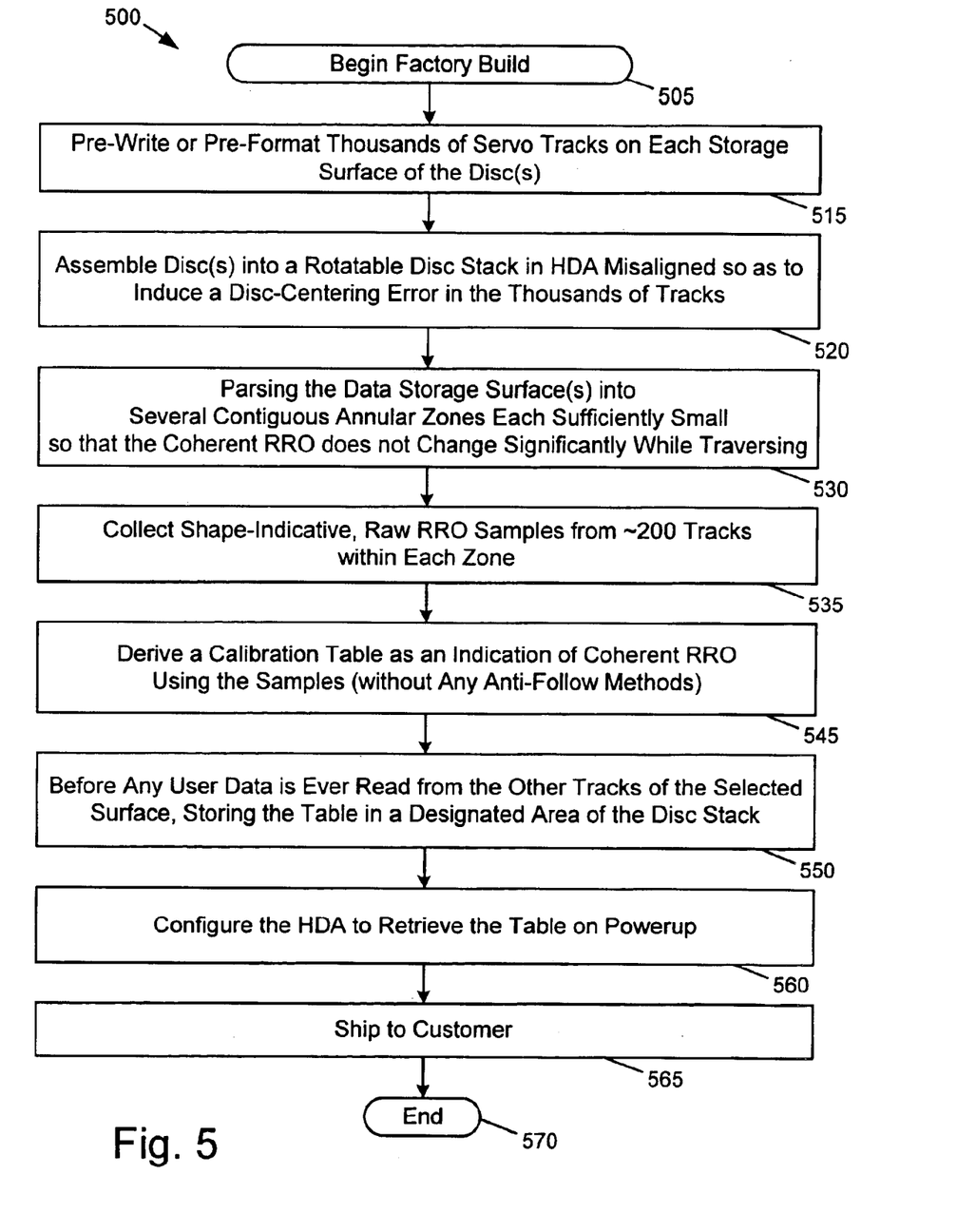
FIG. 5 shows a method of the present invention used for a factory build.

FIG. 5 shows a method 500 of the present invention used for a factory build, including steps 505 through 570. Thousands of servo tracks are pre-written or pre-formatted onto each data storage surface of the disc drive 515. The stack is assembled so as to induce a disc-centering error in the thousands of tracks 520. Each data storage surface is parsed into several contiguous annular zones each small enough so that the coherent RRO (in microinches) changes less than 1% while traversing any given zone 530. Shape-indicative, raw RRO samples are collected from about 20 to 200 tracks within each zone 535. A calibration table is derived as an indication of coherent RRO using the samples, without any anti-follow methods 545. Before any user data is ever read from the other tracks of the selected surface, the table is stored in a designated area of the disc stack 550. The HDA is configured to retrieve the table from the designated area on powerup 560, and the drive is shipped to the customer 570.

Figure 6:
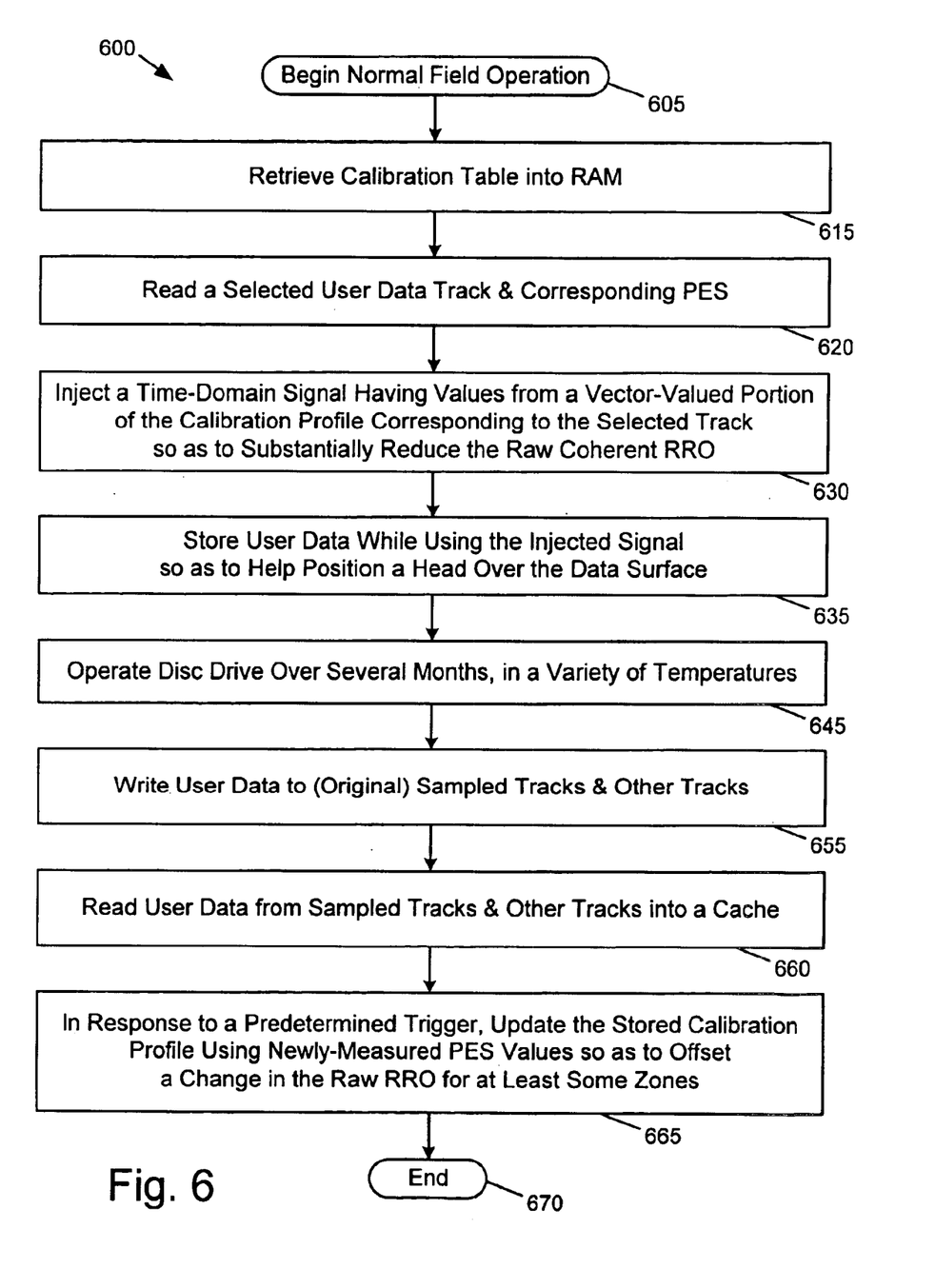
FIG. 6 shows a method of the present invention compatible with the method of FIG. 5 and used for field operation, featuring a field recalibration step.

FIG. 6 shows a method 600 of the present invention used for field operation, as an optional extension of the method 500 of FIG. 5, including steps 605 through 670. The calibration table is retrieved into RAM 615, and a selected user data track is read 620. A time-domain signal is injected having values from a vector-valued portion of the calibration profile corresponding to the selected track 630. Step 630 is performed so as to substantially reduce the raw coherent RRO, such as by using a nearest row from table 300, or an interpolation between the two nearest rows of such a table. User data is stored using the injected signal so as to help position the head over the data surface 635. The disc drive is operated over several months, in an environment having a variety of temperatures 645. Data is written to many tracks, including both those tracks that were originally sampled and the other tracks 655. Then data is read from both the sampled and the other tracks, into a cache of the disc drive 660.

In response to a predetermined trigger, the stored calibration profile is field recalibrated using newly-measured PES values so as to offset a change in the raw RRO 665. Refer to the explanation of FIG. 10 for examples of a "predetermined trigger" suitable for use with the present invention.

Figure 7:
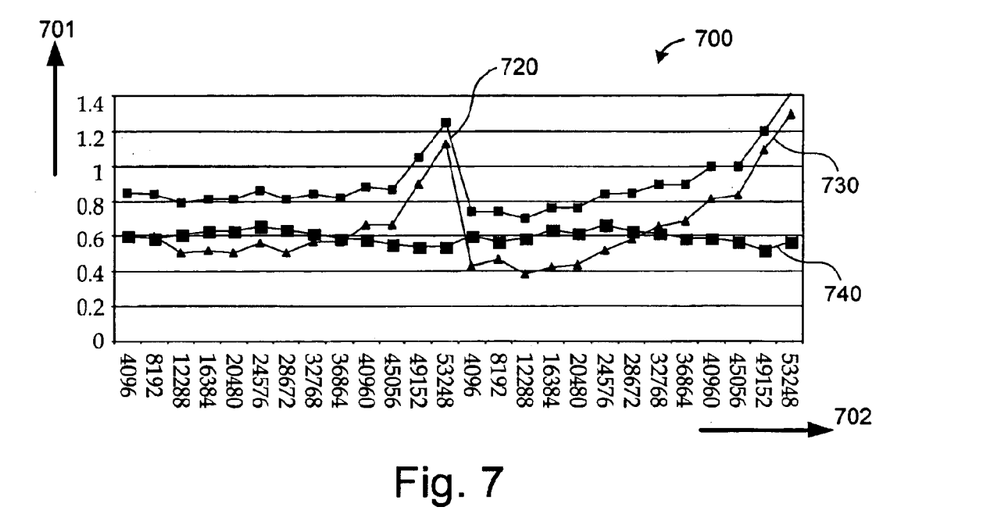
FIG. 7 shows a plot of measured runout as a function of track number for two data surfaces of an actual disc drive not using the present invention.

FIG. 7 shows a plot 700 of measured runout 701 (i.e. 3 sigma RRO in microinches) as a function of track number 702 for two data surfaces of an actual disc drive not using the present invention. The disc stack was built using media prewritten on an MDW (Multi-Disk Writer) so that the tracks are centered about an axis offset from the stack's axis by a substantial offset. (As used herein, a "substantial offset" is one that is at least two orders of magnitude larger than a nominal track width.) As FIG. 7 shows, this substantial offset causes a large coherent RRO that makes track following difficult.

At each track number 702, plot 700 shows a total RRO 720 that results from a combination of coherent RRO 730 and incoherent RRO 740. Despite the manageable level of incoherent RRO 740, plot 700 shows that total RRO 720 grows by more than 15% at the innermost (highest-numbered) tracks. This unmanageable level results from the drastic increase (i.e. more than 20%) in coherent RRO 730 at the highest-numbered tracks. (This is despite the use of a weighted sine-cosine adaptive compensation that Seagate calls "AFC 1-3F," which is a fairly conventional system for present purposes. It does not take specific advantage of RRO coherency.)

Figure 8:
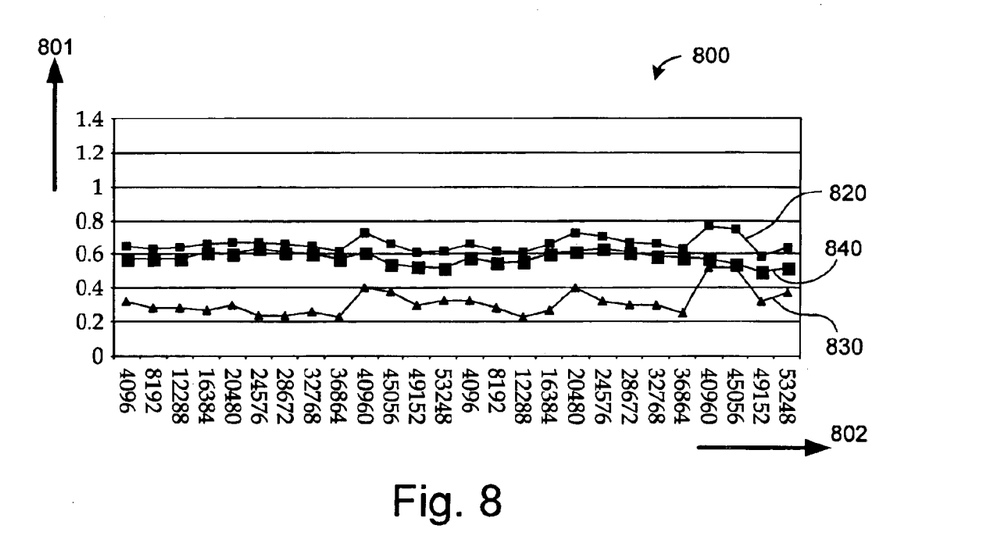
FIG. 8 shows a plot of measured runout as a function of track number for two data surfaces, just as that of FIG. 7 but using an embodiment the present invention.

FIG. 8 shows a plot 800 of measured runout 801 (i.e. 3 sigma RRO in microinches) as a function of track number 802 for two data surfaces, just as that of FIG. 7. FIG. 8 shows shows a total RRO 820 that results from a combination of coherent RRO 830 and incoherent RRO 840. Total RRO 820 is drastically less than total RRO 720 of FIG. 7. This is because the present invention has been used to drastically reduce coherent RRO 830, as compared with coherent RRO 730. This benefit was achieved with ACFC applied for orders 2F–40F with six ACFC zones per surface, with only "AFC 1F" turned on.

Figure 9:
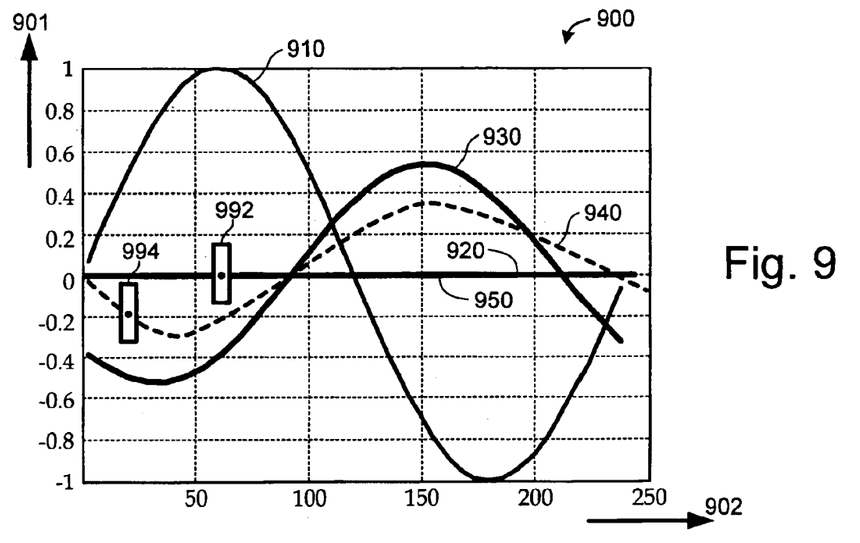
FIG. 9 shows radial offset as a function of angular position, to illustrate why an "anti-follow" scheme previously in use at Seagate Technology might not be especially well adapted to field recalibration.

FIG. 9 shows radial offset 901 as a function of angular position 902 schematically, for each of several tracks and paths. It illustrates why an "anti-follow" scheme previously in use at Seagate Technology might not be especially well adapted to field recalibration. Field recalibration is sometimes desirable in order to account for RRO changes due to time and temperature. Curve 910 represents the initially written servo track. Radial offset 901 of curve 910 varies because the track is not perfectly cirular, initially. Curve 920 represents a track that has been corrected by writing correction factors onto the medium so that head 992 follows a substantially circular path. If every track is suitably corrected with such factors, all of the tracks are substantially circular, and RRO and track misregistration are substantially zero.

Curve 930 shows the shape of the same servo track at a later time, after thermal variation and related stresses have made the track of the corrected curve imperfect (noncircular) again. Curve 940 shows a path of head 994 as the servo system tries to position the head over the degraded path of curve 930. (Head path 940 is somewhat close to degraded path 930, so this attempt is seen to be partially successful.)

Consider what the effect would be of performing a field recalibration, after writing a significant amount of user data using a head path like 940. One of ordinary skill will appreciate that head path 940 is not perfectly circular. Field recalibration will cause head 994 to follow a more circular path (e.g. 950), but field recalibration will not move the already-written user data. Thus, field recalibration will cause head 994 to track follow poorly, when an attempt is made to read the already-written user data. Field recalibration, under these circumstances, will have the desirable effect of making RRO substantially equal to zero, but its effect upon track misregistration will be disastrous. Field recalibration should thus not be attempted on any track containing critical data, under these circumstances.

Figure 10:
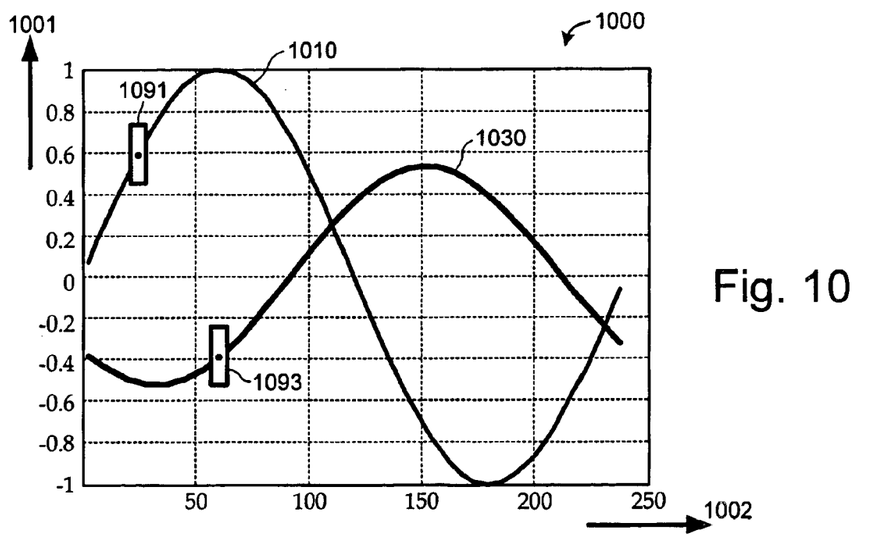
FIG. 10 shows radial offset as a function of angular position, to illustrate why an embodiment of the present invention is better suited to field recalibration than the "anti-follow" scheme of FIG. 9.

FIG. 10 shows radial offset 1001 as a function of angular position 1002 to show how the present "follow" scheme is better suited to field recalibration than the "anti-follow" scheme of FIG. 9. Under this scheme, head 1091 follows an imperfect path 1010. Because the servo system has a priori knowledge of coherent RRO near the path 1010, this following is quite accurate initially. After some time, however, thermal variation and related stresses change the shape of path 1010 (e.g. to the shape of distorted path 1030).

This situation lends itself to field recalibration much more readily than that of FIG. 9. At some point before, during or after the path distortion, user data may be written along it. Head 1093 may not follow distorted path 1030 perfectly before field recalibration, but it will be close enough that any such user data will be reasonably close to distorted path 1030 at the time of field recalibration.

Field recalibration will cause head 1093 to follow path 1030 much more accurately. Despite this, it can be expected that head 1093 will still be able to read user data written (imperfectly) along path 1030. If most of the distortion occurs after writing the user data, in fact, skilled artisans will appreciate that the user data might only be readable by means of such field recalibration. Under these circumstances, using the present invention in lieu of the scheme of FIG. 9, RRO and TMR are both significantly reduced as a result of the field recalibration. Thus, the present invention is well adapted to field recalibration.

Optionally, read retries may be made using a path halfway between the original path 1010 and the distorted path 1030, enhancing the likelihood that the user data will be recovered. Field recalibration is optionally triggered by reaching a predetermined read retry step, or by entering idel mode, or by exceeding a soft error rate limit, or by sensing a drive temperature more than 10 degrees hotter or colder than that of the most recent calibration. Alternatively or additionally, field recalibration can be triggered by an indicator of coherent RRO exceeding a predetermined limit, or by the passage of a predetermined interval of time since a most recent calibration.

With any of these field recalibration triggers, any of several recalibration methods are also available for use with the present invention. Referring again to step 430 of FIG. 4, for example, the CRRO(z) values can be computed from PES values measured with ACFC turned off (e.g. with all of the values of table 300 set to zero). This field recalibration technique is essentially a repeat of the factory calibration. Alternatively, the CRRO(z) values can be computed with PES values measured obtained while applying the pre-existing (factory) ACFC correction values. Adding the resulting new "delta" correction values to the previous correction values (e.g. in table 300) has the advantage that the correction improves with each calibration cycle. The net effect of this approach is similar to that of increasing the number of tracks averaged to calculate CRRO(z). It is also more forgiving of any error in the system closed loop transfer function, T(jw).

Alternatively characterized, a first embodiment of the present invention is a method of making a disc drive. A stack of discs (such as 110) is assembled with one or more data storage discs each including one or two data storage surfaces (such as 200). The data storage surfaces contain thousands of annular tracks consisting of a measured subset (such as 213,215) of the thousands interspersed with an unmeasured subset (such as 214,216) of the thousands. A calibration profile is derived based on several position error signals (such as 286,287,288,289) each obtained by reading from the measured subset and not from the unmeasured subset (such as by step 545). The disc drive is then configured to use the derived calibration profile in a normal operating mode (such as in step 550).

In a second alternative embodiment, the derivation includes a step of parsing the thousands of tracks of a disc's data surface into several nonoverlapping annular zones each narrow enough that a raw Repeatable Run Out (RRO) thereof is coherent (such as by step 530). It also includes generating a composite Position Error Signal (PES) as an arithmetic combination of several PES's each obtained from a respective track of a selected annular zone of the surface (such as by steps 420 and 430). It also includes applying a transform to a series of time-domain runout values to obtain several frequency-domain values (such as by step 430). It also includes applying an inverse transform to the frequency-domain RRO values to obtain several time-domain RRO values (such as by step 430).

In a third embodiment, user data is stored to at least one track of the first subset while using the calibration profile so as to substantially eliminate a raw coherent repeatable runout (such as by step 655). Other user data is then stored to at least one track of the second subset while using the calibration profile so as to help position a head over the at least one track (such as by step 655).

In a fourth embodiment, at least a part of the calibration profile is retrieved into a volatile memory (such as by step 615) in response to a power-on event (such as in step 605). Later, also in response to the power-on event or other trigger, at least a part of the profile is field recalibrated (such as by step 665).

In a fifth embodiment, the calibration profile is calculated digitally and stored as a table (such as 300) in a designated area of the disc stack (such as by step 550) that is read automatically on power-up. Moreover, the table is field recalibrated monthly (such as by step 665).

In a sixth embodiment, the normal operating mode of the configuring step does not include using ZAP or any other anti-follow methods (such as by step 545). Moreover, the deriving step and the configuring step are both completed before any data is ever read from the second subset (such as by step 550).

A seventh embodiment of the present invention is an apparatus (such as 100) including a disc stack including at least one data storage surface having thousands of annular tracks (such as 112,221). The thousands of tracks comprise a first subset (such as 213,215) and a second subset (such as 214,216) interspersed together.

The apparatus also includes means (such as 106) for using a calibration profile derived from several position error signals (such as 286,287) each obtained by reading from the first subset and not by reading from the second subset. The calibration profile is a table (such as 300) stored on the disc stack. The first subset contains X tracks, X being an integer less than 5000. The table contains less than 100X bytes of data, and the second subset contains more than 100X tracks.

An eighth embodiment of the present invention is a disc drive in which substantially all of the tracks of at least two data storage surfaces have a 3 sigma raw repeatable runout (such as 720) larger than 0.1 microinches. Also, substantially all of the tracks of the data storage surfaces have a 3 sigma compensated coherent repeatable runout (such as 830) smaller than 0.6 microinches. Moreover, substantially all of the tracks of the data storage surfaces have a 3 sigma compensated repeatable runout (such as 820) smaller than 0.8 microinches.

A ninth embodiment of the present invention is a disc drive (such as 100) having a controller (such as 106) that performs all of the methods 400,500,600 described above. During these steps, only the tracks sampled in step 535 are used to derive data that is stored on the disc stack. In fact, no digital data derived from any position error measurement for the "other" tracks is stored in any nonvolatile storage area the disc drive.

A tenth embodiment of the present invention is a disc drive (such as 100) having a disc stack including at least one data storage surface having thousands of annular tracks. Each of the tracks has several raw servo marks (such as 231,251). The disc drive also includes following means (such as 106) for using a calibration profile (such as 300) to follow a selected one of the tracks without reading any anti-follow adjustment factors (such as ZAP correction factors) from the selected track. The calibration profile is preferably configured to reduce a coherent repeatable runout of the selected track by at least 50%. Optionally, the disc drive further includes means (such as 106) for updating the calibration profile after several months in a normal operating mode.

All of the structures and methods described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, the present calibration profile may be stored in a nonvolatile memory of a computer chip, rather than on disc surfaces. In addition, although the preferred embodiments described herein are largely directed to fixed magnetic media, it will be appreciated by those skilled in the art that many teachings of the present invention can be applied in other contexts, such as optical or removable media, without departing from the scope and spirit of the present invention.

What is claimed is:

1. A method of making a disc drive comprising steps of:
   (a) from at least one data storage surface having thousands of annular tracks, the thousands of tracks comprising first and second interspersed subsets thereof, deriving a runout compensation calibration profile for the data storage surface based on several position error signals each obtained by reading from the first subset and not by reading from the second subset; and
   (b) configuring the disc drive to use the calibration profile in a normal operating mode for the first and second subsets.

2. The method of claim 1, in which the deriving step (a) includes steps of:
   (a1) applying a transform to a series of time-domain runout values to obtain several frequency-domain values; and
   (a2) applying an inverse transform to the frequency-domain RRO values produced in the applying step (a1) to obtain several time-domain RRO values.

3. The method of claim 1, in which the deriving step (a) includes a step (a1) of generating a composite Position Error Signal (PES) of a selected annular zone of the surface.

4. The method of claim 3, in which the generating step (a1) is performed by arithmetically combining several PES's each obtained from a respective one of the tracks of the selected zone.

5. The method of claim 1, in which the deriving step (a) includes steps of:
   (a1) parsing the thousands of tracks into several nonoverlapping annular zones each narrow enough that a raw Repeatable Run Out (RRO) thereof is coherent;
   (a2) generating a composite Position Error Signal (PES) of a selected one of the zones by averaging several PES's each obtained from a respective one of the tracks of the selected zone;
   (a3) applying a transform to the composite PES to obtain several frequency-domain RRO values; and
   (a4) applying an inverse transform to the frequency-domain RRO values produced in the applying step (a3) to obtain several time-domain RRO values.

6. The method of claim 1, in which the deriving step (a) includes a step (a1) of parsing the thousands of tracks into several nonoverlapping annular zones each narrow enough that a raw Repeatable Run Out (RRO) thereof is coherent.

7. The method of claim 1, further comprising a step (c) of storing user data to at least one track of the first subset while using the calibration profile so as to substantially eliminate a raw coherent repeatable runout.

8. The method of claim 1, further comprising a step (c) of storing user data to at least one track of the second subset while using the calibration profile so as to help position a head over the at least one track.

9. The method of claim 1, further comprising a step (c) of retrieving at least a part of the calibration profile into a volatile memory in response to a power-on event.

10. The method of claim 1, in which the deriving step (a) includes a step (a1) of field recalibrating at least a part of the profile as a response to a predetermined criterion.

11. The method of claim 10, in which the predetermined criterion is a power-on event.

12. The method of claim 1, in which the deriving step (a) includes a step (a1) of storing several time-domain values each derived from one or more measured position error values.

13. The method of claim 1, in which the configuration step (b) includes a step (b1) of storing the table in a designated area of the disc stack.

14. The method of claim 1, in which the deriving step (a) includes a step (a1) of field recalibrating at least a part of the profile periodically.

15. The method of claim 1, in which the deriving step (a) consists of calculating and storing digital data in a table.

16. The method of claim 1, further comprising the steps of:
(a1) writing the thousands of tracks onto the one data storage surface; and
(a2) after the writing step (a1), building a disc stack into a Head-Disc Assembly of the disc drive misaligned so as to induce a disc-centering error in the thousands of tracks.

17. The method of claim 1, in which the deriving step (a) and the configuring step (b) are both completed before any data is ever read from the second subset.

18. The method of claim 1, further comprising a step (c) of using the calibration profile in reading user data from the second subset into a memory cache of a controller of the disc drive.

19. The method of claim 1, in which the normal operating mode of the configuring step (b) does not include using any anti-follow methods.

20. An apparatus comprising:
at least one data storage surface having thousands of tracks, each track having several raw servo marks; and
following means for using a calibration profile to follow a selected one of the tracks without reading any anti-follow adjustment factors from the selected track.

21. The apparatus of claim 20, in which the calibration profile is configured to reduce a coherent repeatable runout of the selected track by at least 50%.

22. The apparatus of claim 20, further including means for updating the calibration profile after several months in a normal operating mode.

23. The apparatus of claim 20, in which the at least one data storage surface has a designated area containing the calibration profile.

24. The apparatus of claim 20, in which the following means includes enough volatile memory space to store the calibration profile.

25. An apparatus comprising:
at least one data storage surface having thousands of tracks, the thousands of tracks including first and second interspersed subsets thereof; and
means for using a calibration profile derived from several position error signals each obtained by reading from the first subset and not by reading from the second subset.

26. The apparatus of claim 25, in which the first subset contains less than 5000 tracks.

27. The apparatus of claim 25, in which the first subset contains X tracks, X being an integer, and in which the second subset contains more than 100X tracks.

28. The apparatus of claim 25, in which no digital data derived from a position error measurement of the second subset is stored anywhere on the at least one data storage surface.

29. The apparatus of claim 25, in which the calibration profile is a table stored on the at least one data storage surface.

30. The disc drive of claim 25, in which the first subset contains X tracks, X being an integer, and in which the calibration profile contains less than 100X bytes of data.

* * * * *